(12) United States Patent
Zhang

(10) Patent No.: US 11,245,822 B2
(45) Date of Patent: Feb. 8, 2022

(54) CAMERA MODULE, CAMERA ASSEMBLY AND ELECTRONIC DEVICE

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 105 days.

(21) Appl. No.: 16/435,461

(22) Filed: Jun. 7, 2019

(65) Prior Publication Data

US 2019/0387139 A1 Dec. 19, 2019

(30) Foreign Application Priority Data

Jun. 15, 2018 (CN) .......................... 201810618468.5

(51) Int. Cl.
*H04N 5/225* (2006.01)
*H04N 5/232* (2006.01)

(52) U.S. Cl.
CPC ......... *H04N 5/2253* (2013.01); *H04N 5/2254* (2013.01)

(58) Field of Classification Search
CPC .. H04N 5/2253; H04N 5/2254; H04N 5/2257; H04N 5/2258; H04N 5/23248; H04N 5/23264; H04N 5/2328; H04N 5/23283; H04N 5/23287; H04M 1/0264
USPC ......... 348/208.99, 208.7, 208.8, 208.11, 374
See application file for complete search history.

(56) References Cited

U.S. PATENT DOCUMENTS

| | | | |
|---|---|---|---|
| 10,488,631 B2 * | 11/2019 | Bachar | H04N 5/2254 |
| 2008/0225139 A1 | 9/2008 | Nomura et al. | |
| 2010/0195206 A1 | 8/2010 | Miyamori et al. | |
| 2012/0128339 A1 | 5/2012 | Hu | |
| 2013/0021485 A1 | 1/2013 | Hsu | |
| 2014/0253799 A1 * | 9/2014 | Moon | H04N 5/2253 348/376 |
| 2015/0002683 A1 | 1/2015 | Hu et al. | |
| 2015/0366110 A1 * | 12/2015 | Park | H04M 1/0264 348/373 |
| 2017/0242225 A1 * | 8/2017 | Fiske | H04N 5/23296 |

(Continued)

FOREIGN PATENT DOCUMENTS

| | | |
|---|---|---|
| CN | 101681081 | 3/2010 |
| CN | 102789236 | 11/2012 |

(Continued)

OTHER PUBLICATIONS

SIPO, Second Office Action for CN Application No. 201810618468. 5, dated Dec. 3, 2019.

(Continued)

*Primary Examiner* — Anthony J Daniels
(74) *Attorney, Agent, or Firm* — Hodgson Russ LLP

(57) ABSTRACT

A camera module, a camera assembly and an electronic device are provided. The camera module includes a casing, a mounting base, a light deflection element, an image sensor and a driving device. The casing has a light inlet. The mounting base is disposed in the casing. The light deflection element is fixed to the mounting base, and configured to deflect an incident light entering through the light inlet. The image sensor is arranged in the casing and configured to sense the defected incident light. The driving device has an arc rail, and is configured to drive the mounting base to rotate around a central axis of the arc rail along the arc rail.

19 Claims, 13 Drawing Sheets

(56) References Cited

U.S. PATENT DOCUMENTS

| 2018/0095293 | A1* | 4/2018 | Yeon | H02P 6/006 |
| 2018/0224088 | A1* | 8/2018 | Park | F21V 7/0025 |
| 2018/0239161 | A1* | 8/2018 | Seol | G02B 27/646 |
| 2018/0356645 | A1* | 12/2018 | Jeong | H04N 5/2253 |
| 2019/0129197 | A1* | 5/2019 | Kim | G02B 27/646 |
| 2019/0239375 | A1* | 8/2019 | Lu | H04N 5/2252 |

FOREIGN PATENT DOCUMENTS

| CN | 104980542 | 10/2015 |
| CN | 206039030 | 3/2017 |
| CN | 107490845 | 12/2017 |
| CN | 206993252 | 2/2018 |
| CN | 107786781 | 3/2018 |
| CN | 207124681 | 3/2018 |
| CN | 108449540 | 8/2018 |
| EP | 1780567 | 5/2007 |
| WO | 2017208090 | 12/2017 |

OTHER PUBLICATIONS

SIPO, First Office Action of CN Application No. 201810618468, dated May 7, 2019.
EPO, Office Action for EP Application No. 19179661.4, dated Nov. 19, 2019.
WIPO, English translation of the ISR and WO for PCT/CN2019/090945, dated Sep. 2, 2019.
IPI, Office Action for IN Application No. 201914023234, dated Dec. 23, 2020.

\* cited by examiner

US 11,245,822 B2

CAMERA MODULE, CAMERA ASSEMBLY AND ELECTRONIC DEVICE

CROSS-REFERENCE TO RELATED APPLICATION

This application claims priority to Chinese Patent Application No. 201810618468.5, filed Jun. 15, 2018, the entire disclosure of which is incorporated herein by reference.

FIELD

The present disclosure relates to a field of electronic devices, and more particularly, to a camera module, a camera assembly and an electronic device.

BACKGROUND

In the related art, in order to improve the photographing performance of the mobile phone, a periscopic lens is adopted for the camera of the mobile phone. The periscopic lens can perform, for example, 3× optical zoom to obtain images of better quality. The periscopic lens contains a light deflection element configured to deflect the light incident into the periscopic lens and send the deflected light to the image sensor, so that the image sensor captures images outside the periscopic lens. In order to realize the optical stabilization, the periscopic lens drives the light deflection element to rotate through a motor. However, resistances such as a friction generated during the rotation of the light deflection element have a significant influence on the light deflection element, which affects the rotation of the light deflection element, thereby leading to an unsatisfying optical stabilization performance of the periscopic lens.

SUMMARY

Embodiments of the present disclosure provide a camera module, a camera assembly and an electronic device.

The camera module according to embodiments of the present disclosure includes a casing, a mounting base, a light deflection element, an image sensor and a driving device. The casing has a light inlet. The mounting base is disposed in the casing. The light deflection element is fixed to the mounting base, and configured to deflect an incident light entering through the light inlet. The image sensor is arranged in the casing and configured to sense the defected incident light. The driving device has an arc rail, and is configured to drive the mounting base to rotate around a central axis of the arc rail along the arc rail.

The camera assembly according to embodiments of the present disclosure includes a decoration member and a camera module. The camera module includes: a casing having a light inlet; a light deflection element, a mounting base and an image sensor disposed in the casing, the light deflection element being fixed to the mounting base, and configured to deflect an incident light entering through the light inlet and send the defected incident light to the image sensor; and a driving device having an arc rail, and configured to drive the mounting base to rotate around a central axis of the arc rail along the arc rail. The decoration member is arranged over the light inlet.

The electronic device according to embodiments of the present disclosure includes a housing and a camera assembly disposed to the housing. The camera assembly includes: a casing having a light inlet; a decoration ring arranged on the casing, penetrating the housing and protruding from the outer surface of the housing; a flange extending from a bottom of the decoration ring in a direction running away from the decoration ring, and abutting against the inner surface of the housing; a mounting base disposed in the casing; a light deflection element fixed to the mounting base, and configured to deflect a light incident through the light inlet; an image sensor arranged at a side of the light deflection element and configured to sense the defected light; and a driving device having an arc rail, and configured to drive the mounting base to rotate around a central axis of the arc rail along the arc rail.

Additional aspects and advantages of the present disclosure will be given in the following description, some of which will become apparent from the following description or be learned from practices of the present disclosure.

BRIEF DESCRIPTION OF THE DRAWINGS

The above and/or additional aspects and advantages of the present disclosure will become apparent and easy to understand from descriptions of the embodiments with reference to the drawings.

DETAILED DESCRIPTION

Figure 1:
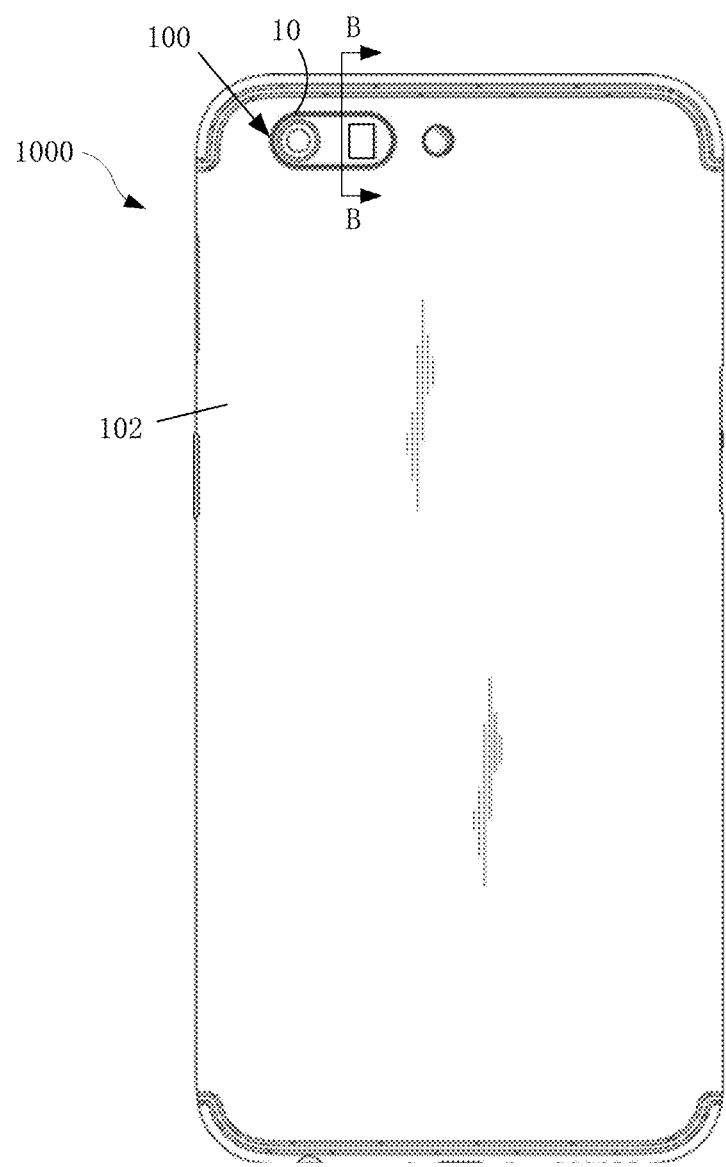
FIG. 1 is a schematic plan view illustrating an electronic device according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the description of the present disclosure, it is to be understood that, terms such as "center", "longitudinal", "lateral", "length", "width", "thickness", "up", "down", "front", "rear", "left", "right", "vertical", "horizontal", "top", "bottom", "in", "out", "clockwise" and "anti-clockwise" refer to the directions and location relations which are the directions and location relations shown in the drawings, intended for describing the present disclosure conveniently and simplifying the description, but are not intended to indicate or imply that the devices or the elements are arranged in particular orientations or are configured and operated in the particular orientations, which thus should not be construed to limit the present disclosure. In addition, terms such as "first" and "second" are used herein for purposes of description and are not intended to indicate or imply relative importance or significance. Furthermore, the feature defined by "first" and "second" may comprise one or more this feature distinctly or implicitly. In the description of the present disclosure, "a plurality of" means two or more than two, unless specified otherwise.

In the description of the present disclosure, unless specified or limited otherwise, it should be noted that, terms "mounted," "connected" and "coupled" may be understood broadly, such as permanent connection or detachable connection or integrated connection, mechanical connection or electronic connection or mutual communication, direct connection or indirect connection via intermediary, inner communication or interaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature. Furthermore, a structure in which a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While a structure in which a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Various embodiments and examples are provided in the following description to implement different structures of the present disclosure. In order to simplify the present disclosure, certain elements and settings will be described. However, these elements and settings are only by way of example and are not intended to limit the present disclosure.

In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

As illustrated in FIG. 1, an electronic device 1000 according to embodiments of the present disclosure includes a housing 102 and a camera assembly 100. The camera assembly 100 is disposed to the housing 102. The electronic device 1000 may be a mobile phone, a tablet computer, a laptop computer, a smart bracelet, a smart watch, a smart helmet, a pair of smart glasses and so on. Embodiments of the present disclosure are explained by taking the mobile phone as an example. It can be understood that the specific form of the electronic device 1000 may be varied, and is not limited herein.

In some embodiments, the housing 102 is an external part of the electronic device 1000, and has a function of protecting internal parts of the electronic device 1000. The housing 102 may be a rear cover of the electronic device 1000, and covers a battery and other parts of the electronic device 1000. In some embodiments, the camera assembly 100 is configured as a rear camera assembly. In other words, the camera assembly 100 is arranged on a back of the electronic device 1000 so that the electronic device 1000 can perform a rearward photographing. As illustrated in FIG. 1, in some embodiments, the camera assembly 100 is arranged in an upper left corner of the housing 102. It can be understood that the camera assembly 100 may be arranged in other portions such as an upper middle portion or an upper right portion of the housing 102. The portion of the housing 102 where the camera assembly 100 is arranged is not limited to embodiments of the present disclosure.

Figure 2:
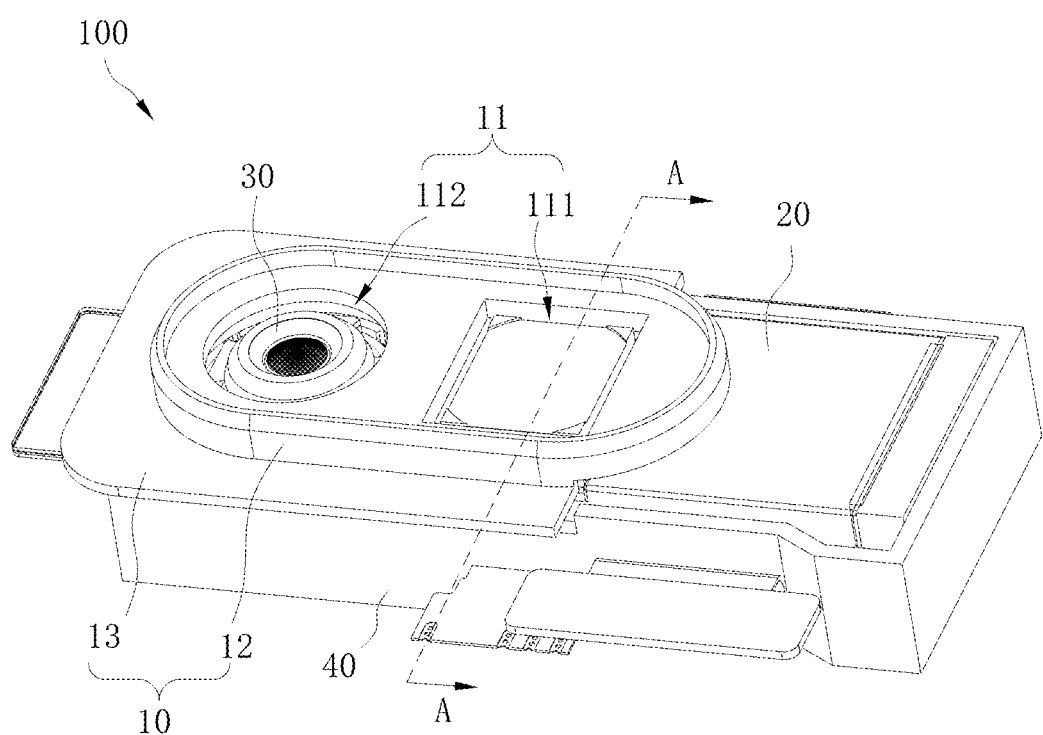
FIG. 2 is a perspective view illustrating a camera assembly according to an embodiment of the present disclosure.
Figure 3:
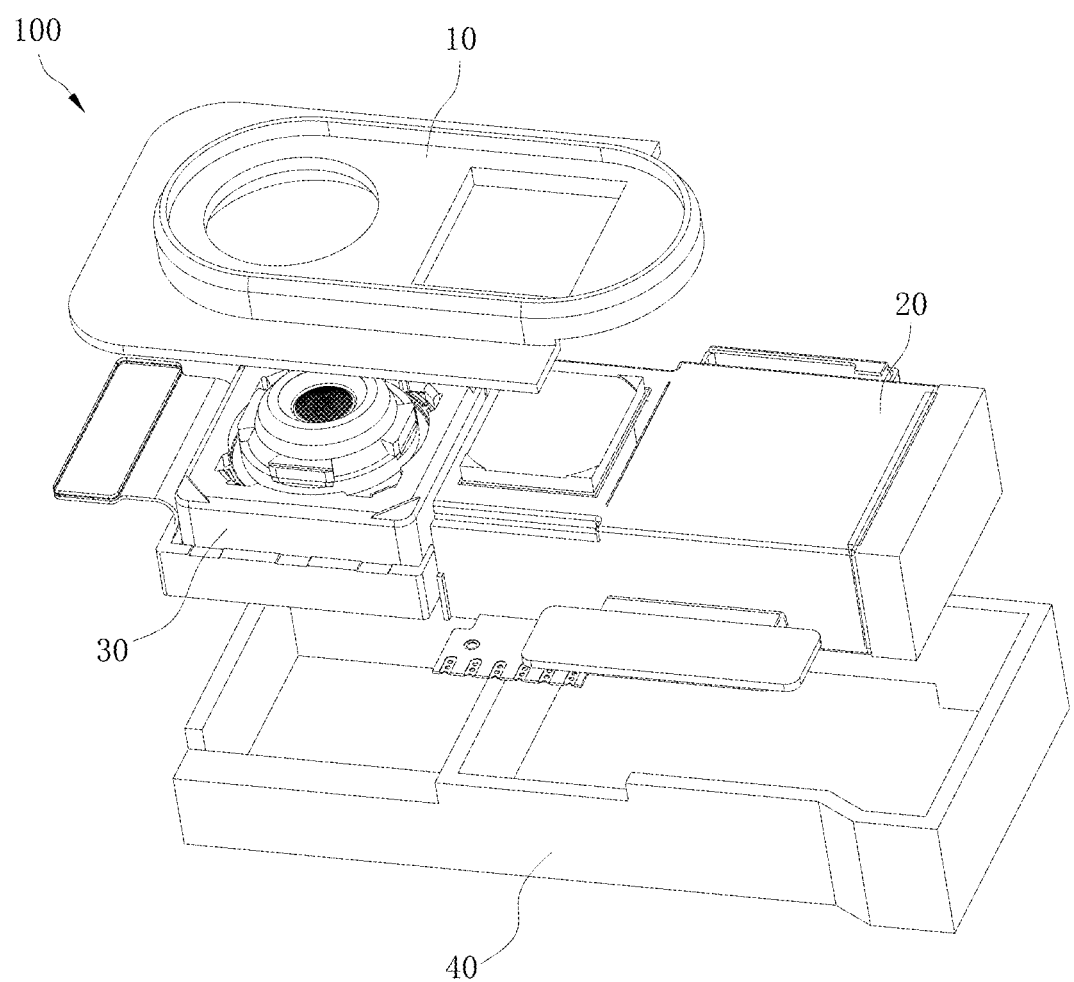
FIG. 3 is an exploded view illustrating a camera assembly according to an embodiment of the present disclosure.

As illustrated in FIG. 2 and FIG. 3, the camera assembly 100 includes a decoration member 10, a first camera module 20, a second camera module 30 and a bracket 40. The decoration member 10 is disposed to the housing 102 and protrudes from a surface of the housing 102. Both the first camera module 20 and the second camera module 30 are accommodated in the housing 102, and arranged adjacent to the decoration member 10. The first camera module 20 and the second camera module 30 are arranged in the bracket 40 and fixedly connected with the bracket 40.

The decoration member 10 is arranged above the bracket 40. In some embodiments, the decoration member 10 may abut against the bracket 40 or be arranged spaced apart from the bracket 10. The bracket 40 may cushion impacts received by the first camera module 20 and the second camera module 30, thereby improving the service life of the first camera module 20 and the second camera module 30.

The decoration member 10 may be made of metal materials, for example, stainless steel. The decoration member 10 may be processed by a polishing treatment so as to provide a glossy surface, which gives the decoration member 10 an aesthetic appearance.

Figure 4:
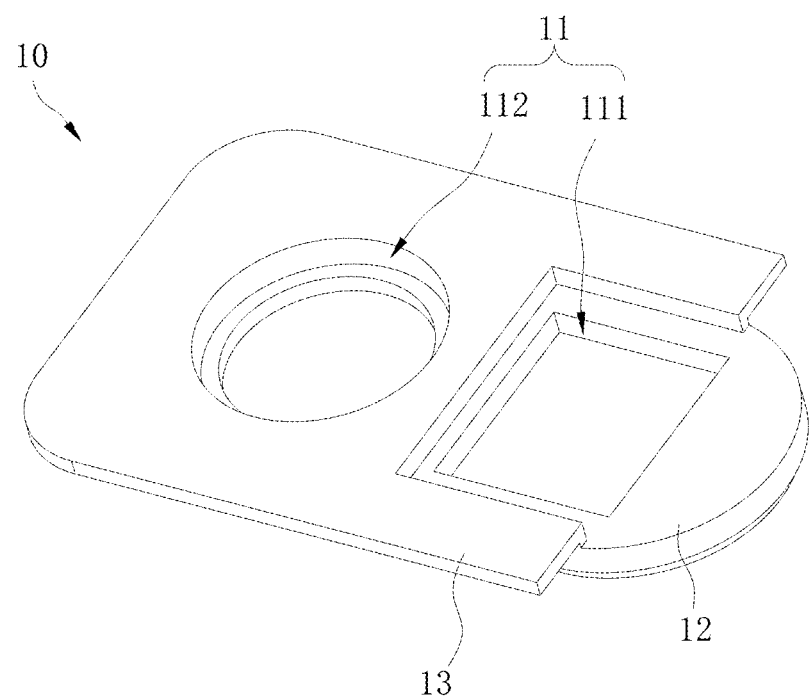
FIG. 4 is a perspective view illustrating a decoration member according to an embodiment of the present disclosure.

As illustrated in FIG. 4, the decoration member 10 defines a through hole 11 through which both the first camera module 20 and the second camera module 30 are exposed out of the decoration member 10. In other words, both the first camera module 20 and the second camera module 30 capture images outside through the through hole 11. In some embodiments, the through hole 11 includes a first sub-hole 111 and a second sub-hole 112. The first sub-hole 111 and the second sub-hole 112 are spaced apart from each other. In other words, the first sub-hole 111 and the second sub-hole 112 are not communicated.

In other embodiments, the first sub-hole 111 and the second sub-hole 112 may be communicated to form an integral hole. The first camera module 20 captures images outside through the first sub-hole 111 and the second camera module 30 captures images outside through the second sub-hole 112. In some embodiments, the first sub-hole 111 is a circular hole and the second sub-hole 112 is a square hole.

In other embodiments, shapes of the first sub-hole 111 and the second sub-hole 112 are not limited to those illustrated in the drawings. For example, both the first sub-hole 111 and the second sub-hole 112 are circular holes. For another example, both the first sub-hole 111 and the second sub-hole 112 are square holes.

The decoration member 10 includes a decoration ring 12 and a flange 13. The flange 13 extends from a bottom of the decoration ring 12 in a direction running away from the decoration ring 12. As illustrated in FIGS. 2, 3, 4, 8 and 11, the through hole 11 is formed in the decoration ring 12 and passes through the decoration ring 12 and the flange 13, the decoration ring 12 is mounted to the housing 102 and the flange 13 abuts against the housing 102. In this case, the flange 13 can limit the position of the decoration member 10 and prevent the decoration member 10 from moving out of the housing 102.

In an embodiment, during the mounting of the decoration member 10, the decoration member 10 is inserted outwards from inside of the housing 102 and mounted to a predetermined position when the flange 13 abuts against an inner surface of the housing 102. The decoration member 10 may be fixed to the housing 102 by an adhesive, or the decoration member 10 may have an interference fit with the housing 102, so that the decoration member 10 will not fall off the housing 102 easily.

The decoration member 10 may be an integrally-formed structure constructed by the decoration ring 12 and the flange 13. For example, the decoration member 10 is manufactured by a cutting process. In addition, the decoration ring 12 and the flange 13 may also be separate structures. In other words, the decoration ring 12 and the flange 13 may be first configured as two separate elements, and then assembled together by processes such as welding so as to provide the decoration member 10.

It should be noted that, in other embodiments, the flange 13 may be omitted. In other words, in this embodiment, the decoration member 10 only includes the decoration ring 12.

The first camera module 20 and the second camera module 30 are arranged in a juxtaposed manner, i.e., the second camera module 30 is disposed on a side of the first camera module 20. In some embodiments, the first camera module 20 and the second camera module 30 are provided in an in-line arrangement. In other words, the first camera module 20 and the second camera module 30 are arranged along the same straight line. In other embodiments, the first camera module 20 and the second camera module 30 may be provided in an L-shape arrangement. The first camera module 20 and the second camera module 30 may be spaced apart from or may abut against each other.

In some embodiments, the first camera module 20 is disposed at a right side of the second camera module 30. Or, in other words, the first camera module 20 is arranged closer to a middle portion of the electronic device 1000 than the second camera module 30. It can be understood that, in other embodiments, positions of the first camera module 20 and the second camera module 30 may be exchanged, i.e., the first camera module 20 may be disposed at a left side of the second camera module 30.

One of the first camera module 20 and the second camera module 30 may be a black and white camera, and the other one of the first camera module 20 and the second camera module 30 may be an RGB camera. Or, one of the first camera module 20 and the second camera module 30 is an infrared camera, and the other one of the first camera module 20 and the second camera module 30 is an RGB camera. Or, one of the first camera module 20 and the second camera module 30 is an RGB camera, and the other one of the first camera module 20 and the second camera module 30 is also an RGB camera. Or, one of the first camera module 20 and the second camera module 30 is a wide-angle camera, and the other one of the first camera module 20 and the second camera module 30 is a telephoto camera. In other embodiments, the second camera module 30 may be omitted, or the electronic device 1000 may include three or more camera modules.

Figure 5:
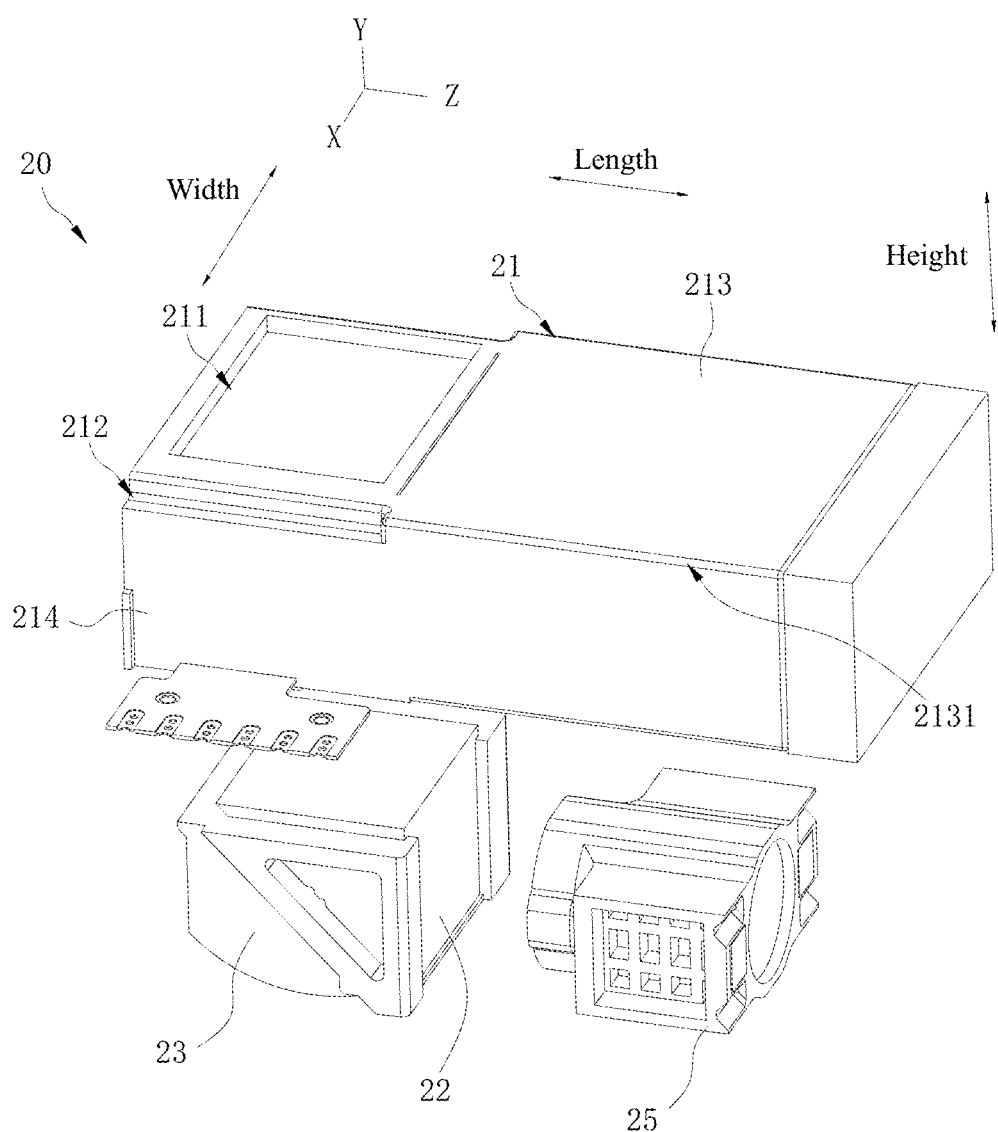
FIG. 5 is an exploded view illustrating a first camera module according to an embodiment of the present disclosure.
Figure 6:
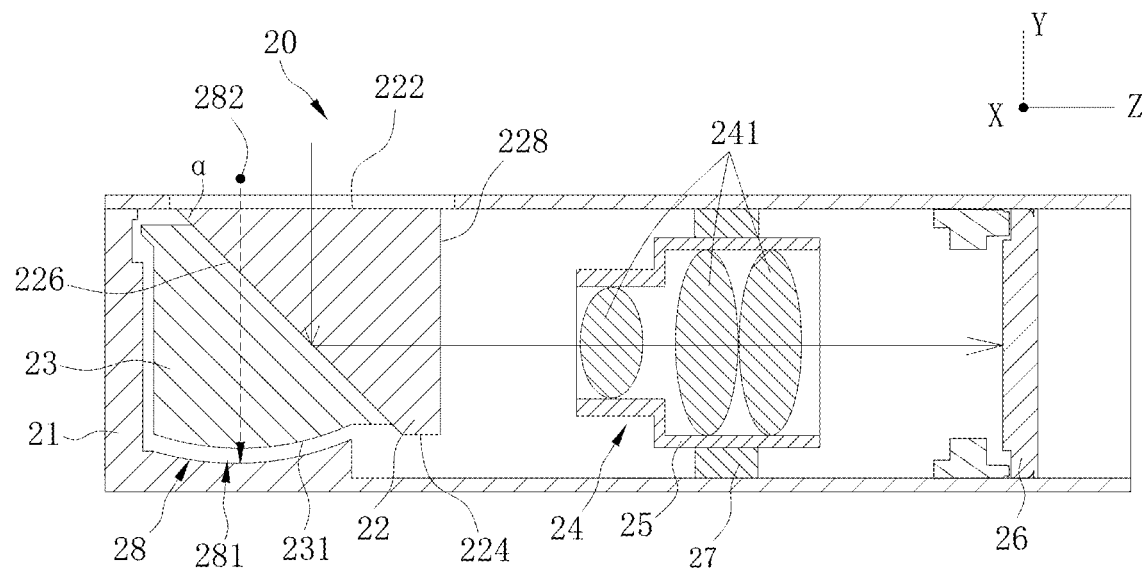
FIG. 6 is a sectional view illustrating a first camera module according to an embodiment of the present disclosure.
Figure 7:
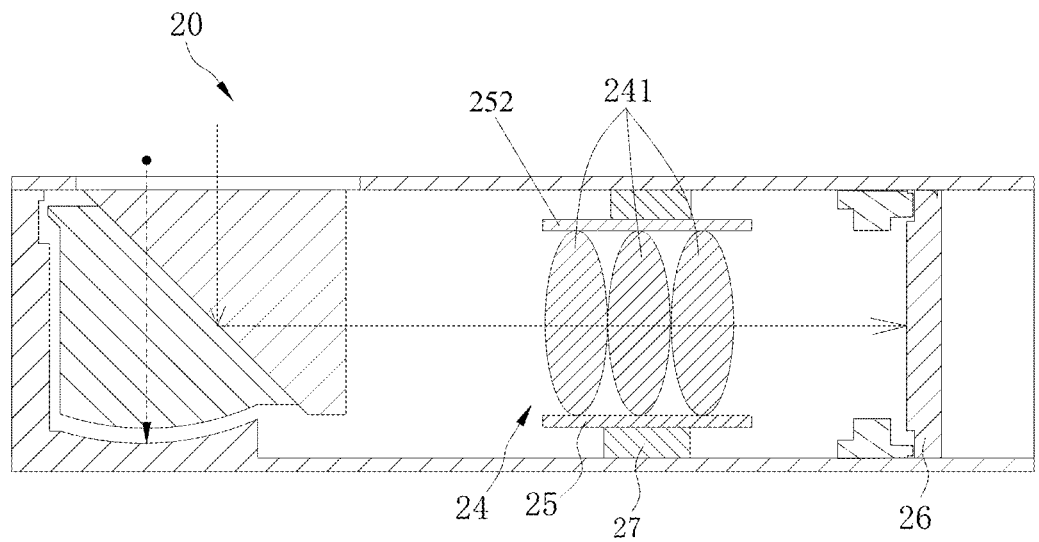
FIG. 7 is a sectional view illustrating a first camera module according to another embodiment of the present disclosure.

As illustrated in FIGS. 5-7, in some embodiments, the first camera module 20 includes a casing 21, a light deflection element 22, a mounting base 23, a first lens unit 24, a movable element 25, a first image sensor 26 and a driving mechanism 27.

The light deflection element 22, the mounting base 23, the first lens unit 24 and the movable element 25 are all arranged in the casing 21. The light deflection element 22 is mounted to the mounting base 23, the first lens unit 24 is accommodated in the movable element 25, and the driving mechanism 27 is connected to the movable element 25 and the casing 21. After entering the casing 21, an incident light is deflected by the light deflection element 22 and transmitted through the first lens unit 24 to the first image sensor 26, such that the first image sensor 26 captures images outside. Further, the driving mechanism 27 drives the movable element 25 to move the first lens unit 24, so as to achieve focusing of the first camera module 20.

The casing 21 is substantially cube-shaped and has a light inlet 211. The incident light enters the first camera module 20 through the light inlet 211. In other words, the light deflection element 22 is configured to deflect the incident light entering through the light inlet 211 and send the deflected incident light to the first image sensor 26. Therefore, it can be understood that the first camera module 20 is a periscopic lens module. Compared with a vertical lens module, the periscopic lens module has a lower height, and thus a whole thickness of the electronic device 1000 can be reduced. The vertical lens module refers to that a lens module whose optical axis is a straight line. In other words, the incident light is transmitted to a photosensitive device of the lens module along a linear optical axis.

It can be understood that the light inlet 211 is exposed from the through hole 11, such that the outside light enters the first camera module 20 through the light inlet 211 after passing through the through hole 11.

Figure 8:
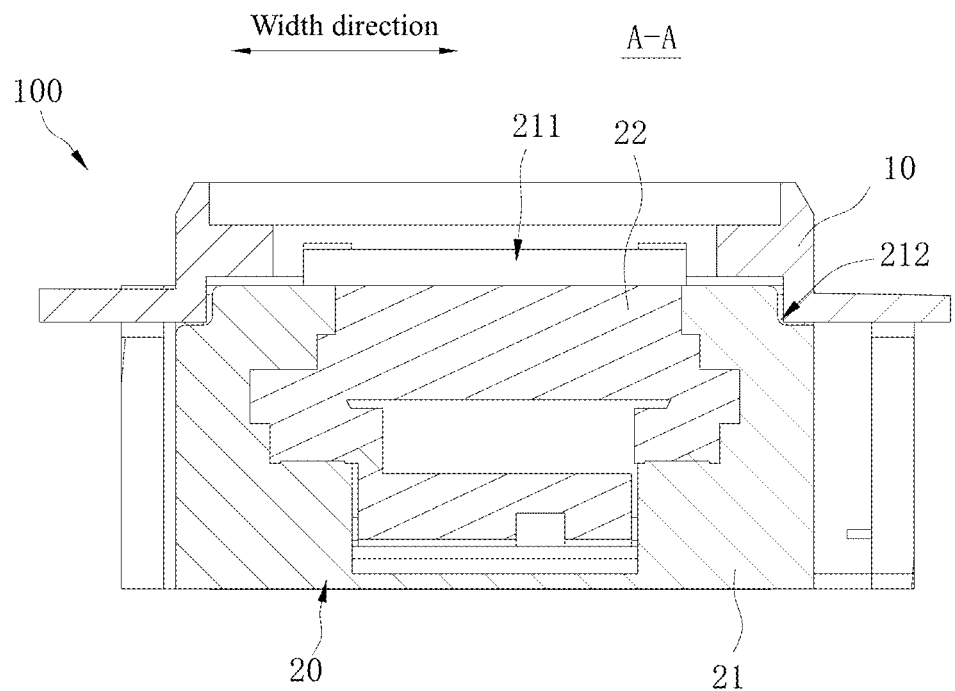
FIG. 8 is a sectional view of the camera assembly taken along a direction A-A in FIG. 2.

As illustrated in FIG. 8, in some embodiments, in a width direction of the first camera module 20, the casing 21 defines a groove 212 at a side of the light inlet 211, and the decoration member 10 is arranged above the light inlet 211 and partially fitted in the groove 212. That is, a part of the decoration member 10 is fitted in the groove 212.

Figure 10:
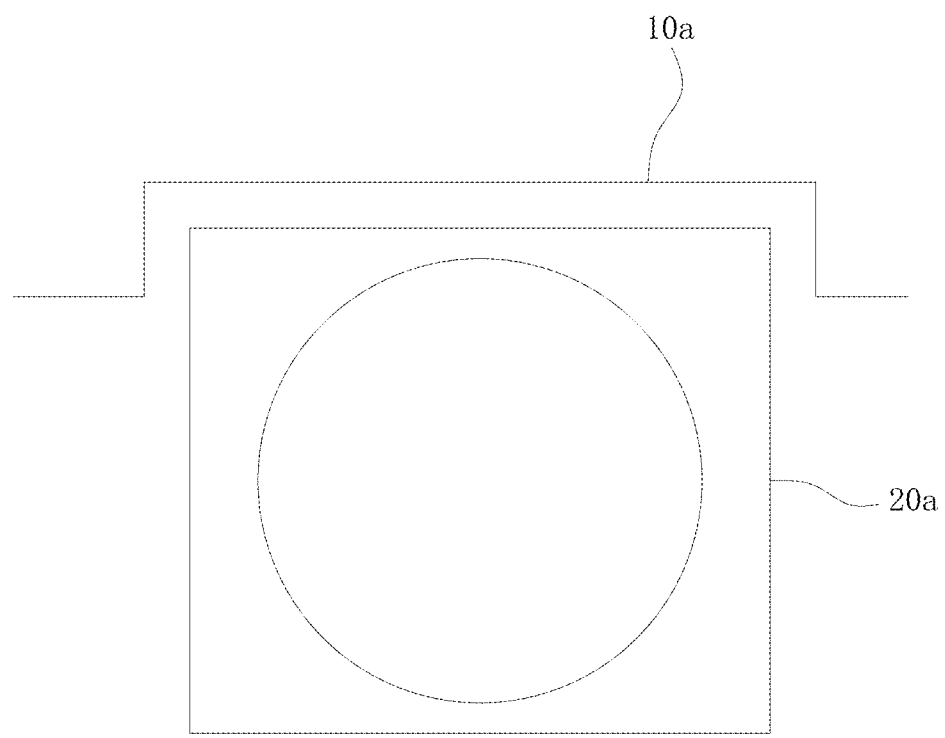
FIG. 10 is a schematic view illustrating a camera module fitted with a decoration member according to an embodiment of the present disclosure.
Figure 11:
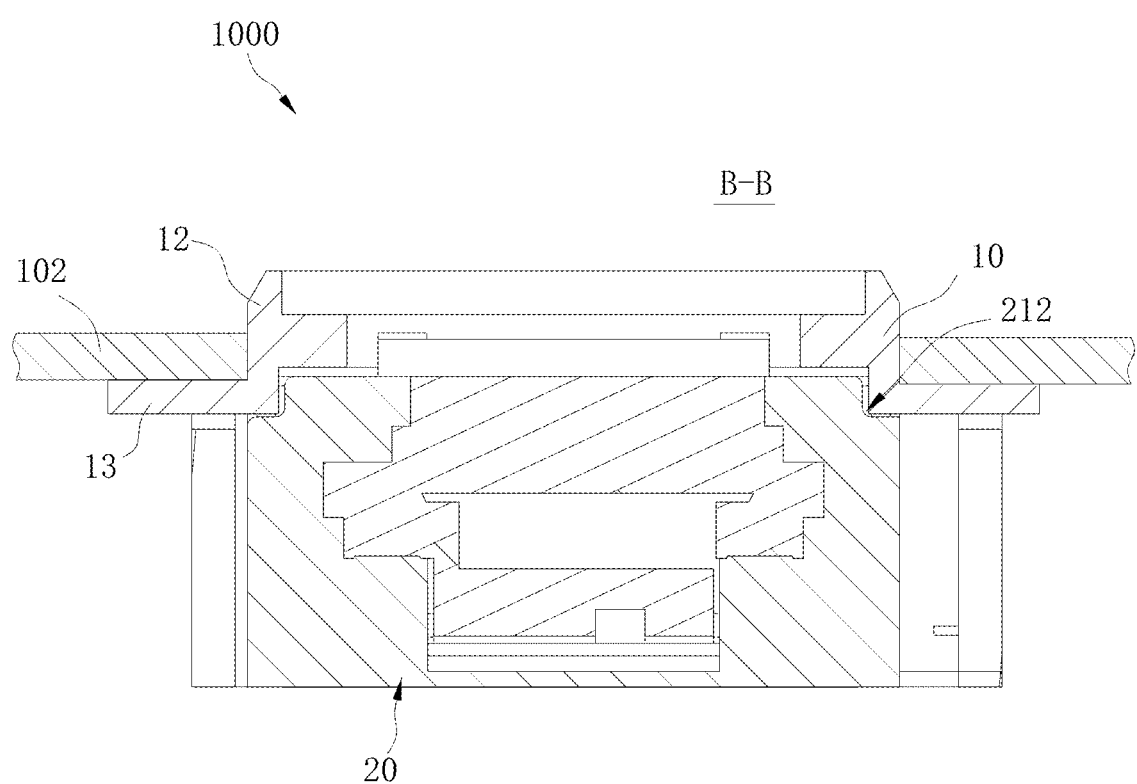
FIG. 11 is a sectional view of the electronic device taken along direction B-B in FIG. 1.

As illustrated in FIG. 10, the groove is omitted in the related art, in order to achieve a small overall thickness of the electronic device, a periscopic camera module 20a partially protrudes into a decoration member 10a in the height direction. That is, a decoration ring of the decoration member 10a has an inner diameter larger than a width of the periscopic camera module 20a, and a part of the periscopic camera module 20a extends into the decoration ring of the decoration member 10a. Since the periscopic camera module 20a has a larger width than the vertical camera module, the decoration member 10a thus has a large size, which runs counter to the aesthetic appearance of the electronic device and makes the electronic device less compact.

Again, as illustrated in FIG. 5 and FIG. 8, in some embodiments, the groove 212 is formed at a side of the light inlet 211, and the decoration member 10 is arranged over the light inlet 211 and partially fitted in the groove 212. Therefore, the width of the decoration member 10 is small and an overall height of the camera assembly 100 is reduced, which facilitates the compactness and miniaturization of the camera assembly 100.

In some embodiments, the casing 21 includes a top wall 213 and a side wall 214. The side wall 214 extends from a side edge 2131 of the top wall 213. The top wall 213 includes two opposite side edges 2131, and two side walls 214 are provided. Each side wall 214 extends from one corresponding side edge 2131. In other words, the side walls 214 are connected to two opposite sides of the top wall 213, respectively. The light inlet 211 is formed in the top wall 213, the groove 212 is formed in a junction between the top wall 213 and the side wall 214, and the decoration member 10 rests against the top wall 213. In this way, it is easy to form the groove 212 and convenient to the manufacture of the casing 21. In some embodiments, the groove 212 is a profiling of the casing 21, i.e., the groove 212 may be formed through stamping.

In some embodiments, the bottom of the decoration ring 12 is partially accommodated in the groove 212 and the decoration ring 12 partially rests against the top wall 213. In other words, the decoration ring 12 and the casing 21 are configured as complementary structures, as the decoration ring 12 and the casing 21 are engaged with each other, such that a fitted structure of the decoration member 10 and the casing 21 is compact.

In some embodiments, the groove 212 is formed in a junction between each side wall 214 and the top wall 213. In other words, two grooves 212 are provided. In other embodiments, a single groove 212 may be provided, i.e., the groove 212 is formed in a junction between one side wall 214 and the top wall 213.

In some embodiments, the groove 212 has an elongated shape. The groove 212 extends along a length direction of the first camera module 20. In this way, the decoration member 10 can be fitted with the groove 212 in a compact way. In some embodiments, the groove 212 may have an arc shape, and the arc groove 212 may surround the light inlet 211. In other embodiments, as long as the decoration member 10 and the first camera module 20 are configured as complementary structures to reduce the size of the decoration member 10, the structure and the shape of the groove 212 are not limited to the above embodiments.

The light deflection element 22 is a prism or a plane mirror. In an embodiment, when the light deflection element 22 is a prism, the prism may be a triangular prism and a cross section of the prism has a right triangle shape. The light is incident through one leg of the right triangle and exits through the other leg after being reflected by the hypotenuse. It can be understood that the incident light may exit after the refraction of the prism without undergoing reflection. The prism may be made of materials having good light transmittance, such as glass or plastic. In an embodiment, a reflective material such as silver may be coated on one surface of the prism to reflect the incident light.

It can be understood that when the light deflection element 22 is a plane mirror, the plane mirror reflects the incident light to deflect the incident light.

Figure 12:
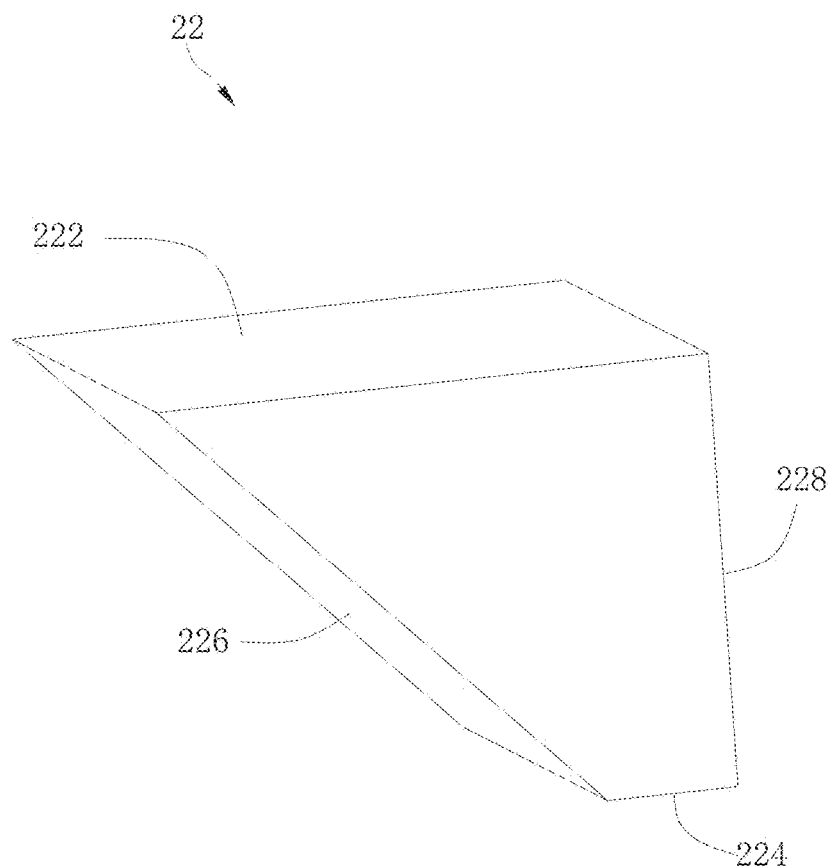
FIG. 12 is a perspective view illustrating a light deflection element according to an embodiment of the present disclosure.

For more information, reference may be made to FIG. 6 and FIG. 12. The light deflection element 22 includes a light incident surface 222 adjacent to and facing the light inlet 211, a fixing surface 224 away from the light inlet 211 and opposite to the light incident surface 222, a reflecting surface 226 connected to the light incident surface 222 and the fixing surface 224, and a light exiting surface 228 connected to the light incident surface 222 and the fixing surface 224. The reflecting surface 226 is arranged obliquely relative to the light incident surface 222, and the light exiting surface 228 is arranged opposite to the reflecting surface 226.

In some embodiments, during the deflection of the light, the light passes through the light inlet 211 and enters the light deflection element 22 through the light incident surface 222, then is reflected by the reflecting surface 226, and finally exits the light deflection element 22 through the light exiting surface 228, so as complete the light deflection process. The fixing surface 224 is fixedly disposed to the mounting base 23 to keep the light deflection element 22 stable.

Figure 13:
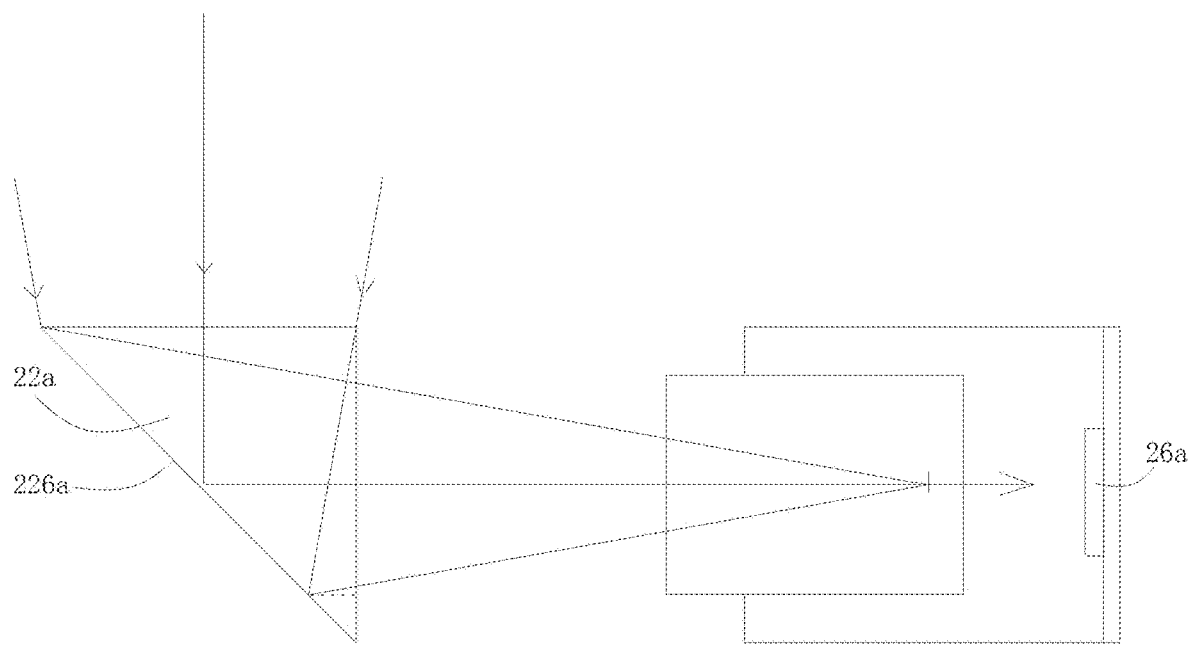
FIG. 13 is a schematic view illustrating light reflection and imaging of a first camera module in the related art.

As illustrated in FIG. 13, in the related art, a reflecting surface 226a of a light deflection element 22a is inclined with respect to a horizontal direction due to requirements of reflecting the incident light, and the light deflection element 22a is asymmetric in a reflection direction of the light. Therefore, a lower portion of the light deflection element 22a has a smaller actual optical area than an upper portion of the light deflection element 22a. It can be understood that part of the reflecting surface 226a away from the light inlet reflects less light or is unable to reflect light.

Figure 14:
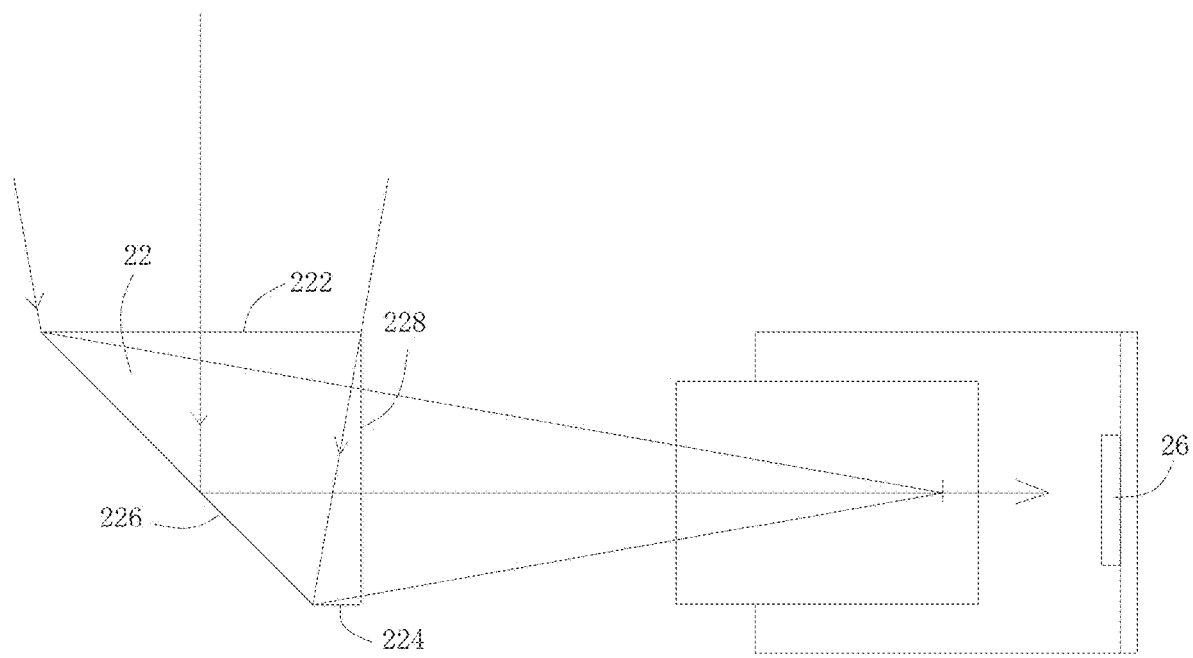
FIG. 14 is a schematic view illustrating light reflection and imaging of a first camera module according to an embodiment of the present disclosure.

Consequently, as illustrated in FIG. 14, compared with the light deflection element 22a in the related technology, the light deflection element 22 in embodiments of the present disclosure cuts off a corner away from the light inlet, which does not affect the light reflection effect of the light deflection element 22, and also reduces an overall thickness of the light deflection element 22.

In some embodiments, the reflecting surface 226 is inclined at an angle α of 45 degrees with respect to the light incident surface 222.

In this way, the incident light is reflected and deflected well, thus providing good light deflection effects.

The light deflection element 22 may be made of materials having good light transmittance, such as glass or plastic. In an embodiment, a reflective material such as silver may be coated on one surface of the light deflection element 22 to reflect the incident light.

In some embodiments, the light incident surface 222 is arranged parallel to the fixing surface 224.

In this way, when the fixing surface 224 is fixedly disposed to the mounting base 23, the light deflection element 22 is kept stable and the light incident surface 222 is also flat. The incident light also has a regular optical path during the deflection process of the light deflection element 22, so that the deflection efficiency of the light is satisfying. In some embodiments, the cross section of the light deflection element 22 is substantially trapezoidal in the light incident direction. In other words, the light deflection element 22 is configured as a substantially trapezoidal element.

In some embodiments, both the light incident surface 222 and the fixing surface 224 are perpendicular to the light exiting surface 228.

In this way, a regular light deflection element 22 may be provided so as to make the optical path of the incident light relatively straight, thereby improving the deflection efficiency of the light.

In some embodiments, a distance between the light incident surface 222 and the fixing surface 224 ranges from 4.8 to 5.0 mm.

In some embodiments, the distance between the light incident surface 222 and the fixing surface 224 may be 4.85 mm, 4.9 mm or 4.95 mm. In other words, the distance range between the light incident surface 222 and the fixing surface 224 may be understood as that a height of the light deflection element 22 is in the range of 4.8-5.0 mm. The light deflection element 22 defined by the light incident surface 222 and the fixing surface 224 falling in the above distance range has a proper volume and can be fitted into the first camera module 20 well, thereby providing a compact and miniaturized first camera module 20, camera assembly 100 and electronic device 1000, so as to satisfy many requirements of consumers.

In some embodiments, a hardening treatment is performed on the light incident surface 222, the fixing surface 224, the reflecting surface 226 and the light exiting surface 228 to form a hardened layer.

When the light deflection element 22 is made of glass or the like, the light deflection element 22 is brittle. In order to increase the strength of the light deflection element 22, the hardening treatment may be performed on the light incident surface 222, the fixing surface 224, the reflecting surface 226 and the light exiting surface 228 of the light deflection element 22. Moreover, the hardening treatment may be performed on all surfaces of the light deflection element to further improve the strength of the light deflection element. The hardening treatment (such as infiltration of lithium ions) applies a film to each of the above surfaces without affecting the light deflection of the light deflection element 22.

In some embodiments, the light deflection element 22 deflects the incident light entering through the light inlet 211 by an angle of 90 degrees. For example, the incident light has an incident angle of 45 degrees on the reflecting surface 226 of the light deflection element 22, and also a reflection angle of 45 degrees. In other embodiments, the light deflection element 22 may also deflect the incident light by another angle, such as 80 degrees, 100 degrees and so on, so long as the incident light can reach the first image sensor 26 after being deflected.

In some embodiments, a single light deflection element 22 is provided, and thus the incident light is transmitted to the first image sensor 26 after a single deflection. In other embodiments, a plurality of light deflection elements 22 may be provided, and thus the incident light is transmitted to the first image sensor 26 after at least two deflections.

The mounting base 23 is configured for arrangement of the light deflection element 22. In other words, the mounting base 23 is a carrier of the light deflection element 22 and the light deflection element 22 is fixed to the mounting base 23. In this way, the position of the light deflection element 22 is determined, which facilitates the light deflection element 22 to reflect or refract the incident light. The light deflection element 22 may be adhered and fixed to the mounting base 23 by an adhesive so as to realize a fixed connection with the mounting base 23.

Again, as illustrated in FIG. 6, in some embodiments, the mounting base 23 may be movably disposed in the casing 21. The mounting base 23 can rotate relative to the casing 21 to adjust a direction of the light deflection element 22 deflecting the incident light.

The mounting base 23 may drive the light deflection element 22 to rotate together in a direction opposite to the shaking of the first camera module 20, thereby offsetting an incidence deviation of the incident light through the light inlet 211 and realizing an optical stabilization performance. The mounting base 23 may be connected to the driving mechanism 27, and the driving mechanism 27 may drive the mounting base 23 to rotate.

The first lens unit 24 is accommodated in the movable element 25. Further, the first lens unit 24 is arranged between the light deflection element 22 and the first image sensor 26. The first lens unit 24 is configured to have the incident light imaged on the first image sensor 26. In this way, the first image sensor 26 can capture images of good quality.

The first lens unit 24 may form images on the first image sensor 26 when moving along its optical axis as a whole, thereby realizing the focusing of the first camera module 20. The first lens unit 24 includes a plurality of lenses 241. When at least one lens 241 moves, an overall focal length of the first lens unit 24 changes, thereby realizing a zoom function of the first camera module 20. Furthermore, the driving mechanism 27 drives the movable element 25 to move in the casing 21 to realize the purpose of zooming.

As illustrated in FIG. 6, in some embodiments, the movable element 25 has a tube shape, and the plurality of lenses 241 are fixed at intervals in the movable element 25 along an axial direction of the movable element 25. Or, as illustrated in FIG. 7, the movable element 25 includes two clips 252, and the two clips 252 clamps the plurality of lenses 241 therebetween.

It can be understood that since the movable element 25 is configured to secure and receive the plurality of lenses 241 that are spaced apart from one another, the length of the movable element 25 needs to be large, and the movable element 25 may have a cylindrical shape, a square tube shape or other shapes with a certain cavity. In this way, the movable element 25 having the tube shape can accommodate the plurality of lenses 241 appropriately and the lenses 241 can be protected in the cavity, so that the lenses 241 will not be shook easily.

In addition, as illustrated in FIG. 7, the movable element 25 includes two clips 252, and the two clips 252 clamps the plurality of lenses 241 therebetween, such that a certain stability is ensured, and the weight of the movable element 25 is reduced. Thus, the power needed by the driving mechanism 27 to drive the movable element 25 is decreased, the design difficulty of the movable element 25 is reduced, and it is easy to arrange the lenses 241 to the movable element 25.

It should be noted that the movable element 25 is not limited to the above tube shape and the two clips 252. In other embodiments, the movable element 25 may include three, four or more clips 252 to establish a more stable structure, or includes one clip 252 to provide a simpler structure. Or, the movable element 25 may have various regular or irregular shapes having a cavity to accommodate the lenses 241, such as a cuboid or a rounded body. Specific choices can be made under the premise of ensuring the normal imaging and operation of the imaging module 10.

The first image sensor 26 may include a complementary metal oxide semiconductor (CMOS) photosensitive element or a charge-coupled device (CCD) photosensitive element.

In some embodiments, the driving mechanism 27 is an electromagnetic driving mechanism, a piezoelectricity driving mechanism or a memory alloy driving mechanism.

In some embodiments, the electromagnetic driving mechanism includes a magnetic field and a conductor. If the magnetic field moves relative to the conductor, an induced current is generated in the conductor. The induced current makes the conductor to be subjected to the Ampere's force, and the Ampere's force enables the conductor to move. The conductor herein serves as a part in the electromagnetic driving mechanism that drives the movable element 25 to move. The piezoelectricity driving mechanism is based on an inverse piezoelectric effect of the piezoelectric ceramics. If voltages are applied to the piezoelectric materials, mechanical stresses will be generated. That is, a diversion occurs between the electrical energy and the mechanical energy. A rotational or linear movement is generated through controlling a mechanical deformation of the piezoelectric materials, thus providing advantages of a simple structure and a low speed.

The drive of the memory alloy driving mechanism is based on characteristics of the shape-memory alloy. The shape-memory alloy is a special alloy. Once the shape-memory alloy remembers any shape, even if deformed, it will return to its original shape before the deformation when heated to an appropriate temperature, thereby achieving the purpose of driving. The shape-memory alloy is featured by a swift position change at any direction.

Again, as illustrated in FIG. 6, the first camera module 20 further includes a driving device 28. The driving device 28 includes an arc rail 281. The driving device 28 drives the mounting base 23 to rotate around a central axis 282 of the arc rail 281 along the arc rail 281, so as to realize the optical stabilization of the first camera module 20.

In this way, the driving device 28 drives the mounting base 23 with the light deflection element 22 to rotate together by using the arc rail 281, such that the friction between the driving device 28 and the mounting base 23 is small, which benefits a stable rotation of the mounting base 23, thereby improving the optical stabilization performance of the first camera module 20.

Figure 15:
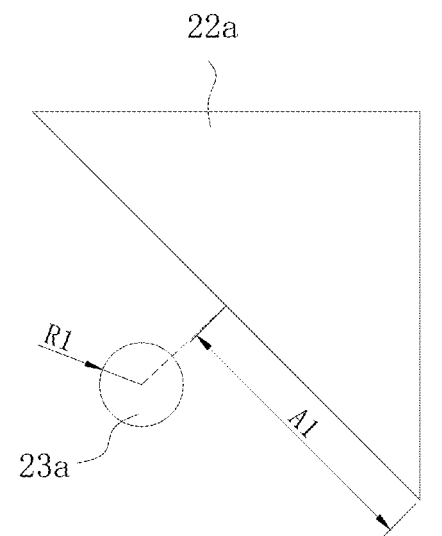
FIG. 15 is a schematic view illustrating a camera module in the related art.
Figure 15:
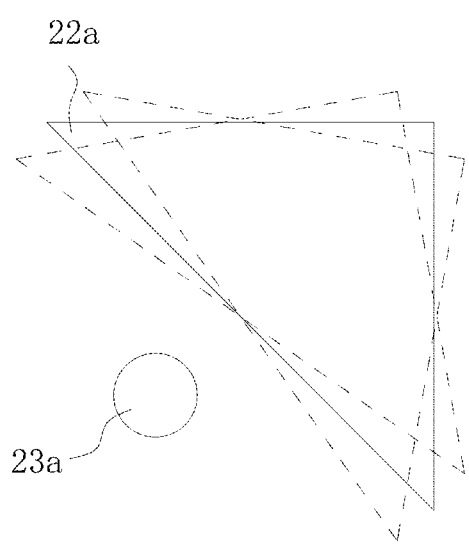

In some embodiments, as illustrated in FIG. 15, in the related art, the mounting base (not shown) is rotatably connected to a rotary shaft 23a, and the mounting base rotates around the rotary shaft 23a to drive the light deflection element 22a to rotate together. Assuming that a the friction force is f1, a radius of the rotary shaft 23a is R1, a thrust is F1 and a radius of rotation is A1, then a ratio K1 of a friction force torque to a thrust torque is denoted as K1=f1R1/F1A1. Considering that the light deflection element 22a merely needs a slight rotation, F1 cannot be too large. Besides, as the camera module itself needs to be light, thin, short and small, the size of the light deflection element 22a cannot be too large, and the increase of A1 is limited. Consequently, the influence of the friction force cannot be further eliminated.

Figure 16:
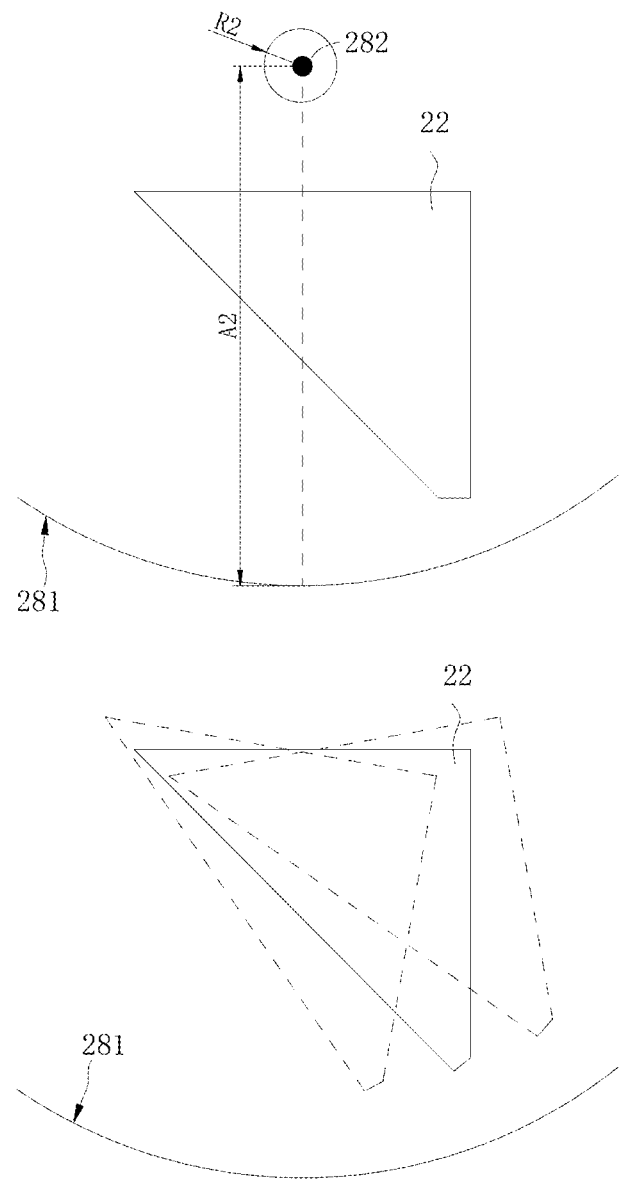
FIG. 16 is a schematic view illustrating a camera module according to an embodiment of the present disclosure.

As illustrated in FIG. 16, in the present disclosure, the mounting base 23 rotates along the arc rail 281. A ratio K2 of the friction force torque to the rotation torque is denoted as K2=f2R2/F2A2, in which f2 represents the friction force, R2 represents an equivalent radius corresponding to the friction force f2, F2 represents the thrust, and A2 represents the radius of rotation. In the case that f2, R2 and F2 do not change greatly with respect to f1, R1 and F1, respectfully, since the rotation is conducted in a swing mode based on the arc rail 281, the radius of rotation A2 is substantially equal to the radius of the arc rail 281, such that A2 is free from limitations of the size of the light deflection element 22 and can be several times of A1. That is, the radius of rotation A2 can be increased significantly relative to the radius of rotation A1. Therefore, in this case, the influence of the friction force on the rotation of the light deflection element 22 can be greatly reduced (i.e. the value of K2 is reduced), thereby improving the rotation precision of the light deflection element 22, and hence the optical stabilization precision of the first camera module 20. Thus, the optical stabilization performance of the first camera module 20 is satisfying.

In some embodiments, the mounting base 23 includes an arc surface 231 arranged concentrically with the arc rail 281 and fitted with the arc rail 281. In other words, a center of the arc surface 231 coincides with a center of the arc rail 281. In this manner, the fit between the mounting base 23 and the driving device 28 is compact.

As illustrated in FIGS. 5-6, in some embodiments, the central axis 282 of the arc rail 281 is perpendicular to the light incident direction of the light inlet 211 and a light-sensing direction of the first image sensor 26. For convenience of description, the width direction of the first camera module 20 is defined as a X direction, a height direction of the first camera module 20 is defined as a Y direction and a length direction of the first camera module 20 is defined as a Z direction. Consequently, the light incident direction of the light inlet 211 is the Y direction, the light-sensing direction of the first image sensor 26 is the Z direction and the central axis 282 of the arc rail 281 is the X direction.

The driving device 28 drives the light deflection element 22 to rotate around the X direction to realize the optical stabilization in the Y direction.

In some embodiments, the central axis 282 is outside the first camera module 20. Therefore, the radius R2 of the arc rail 281 is large, thereby reducing adverse effects of the friction force on the rotation of the mounting base 23.

In some embodiments, the driving device 28 is arranged on the bottom of the casing 21. In other words, the driving device 28 and the casing 21 are integral. In this way, the first camera module 20 has a compact structure.

In some embodiments, the driving device 28 drives the mounting base 23 to rotate in an electromagnetic manner. In an embodiment, a coil is provided to the driving device 28 and an electromagnetic piece is fixed to the mounting base 23. When power is supplied to the coil, a magnetic field is generated by the coil to drive the electromagnetic piece to move, thereby driving the mounting base 23 and the light deflection element to rotate together.

In other embodiments, the driving device 28 may drive the mounting base 23 to move by the piezoelectricity driving or the memory alloy driving. For details of the piezoelectricity driving and the memory alloy driving, references may be made to the above descriptions.

Figure 9:
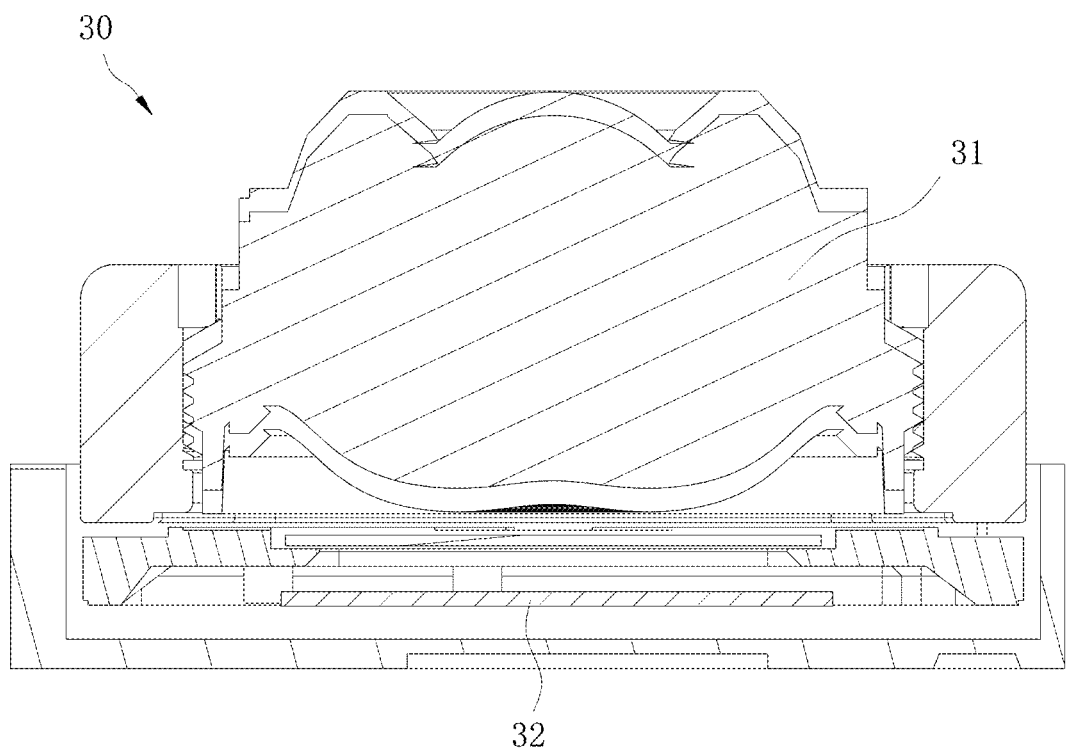
FIG. 9 is a sectional view illustrating a second camera module according to an embodiment of the present disclosure.

As illustrated in FIG. 9, in some embodiments, the second camera module 30 is a vertical camera module. In other embodiments, the second camera module 30 may also be a periscopic camera module. The second camera module 30 includes a second lens unit 31 and a second image sensor 32. The second lens unit 31 is configured to have light imaged on the second image sensor 32. An incident optical axis of the second camera module 30 coincides with an optical axis of the second lens unit 31.

In some embodiments, the second camera module 30 is a fixed-focus lens module. Consequently, the second lens unit 31 has few lenses 241, such that the second camera module 30 has a low height, which facilitates a reduction on the thickness of the electronic device 1000.

The type of the second image sensor 32 may be the same with that of the first image sensor 26, and details will not be described herein again.

From the above, the first camera module 20 according to embodiments of the present disclosure includes a casing 21, a light deflection element 22, a mounting base 23, a first image sensor 26 and a driving device. The light deflection element 22, the mounting base 23 and the first image sensor 26 are all disposed in the casing 21.

The casing 21 is provided with a light inlet 211. The light deflection element 22 is fixed to the mounting base 23. The light deflection element 22 is configured to deflect an incident light entering through the light inlet 211 and send the deflected incident light to the first image sensor 26, so that the first image sensor 26 senses the light outside the first camera module 20.

The driving device 28 includes an arc rail 281. The driving device 28 is configured to drive the mounting base 23 to rotate around a central axis 282 of the arc rail 281 along the arc rail 281, so as to realize optical stabilization of the first camera module 20.

In the first camera module 20 according to embodiments of the present disclosure, the driving device 28 drives the mounting base 23 with the light deflection element 22 to rotate together by using the arc rail 281, such that the friction between the driving device 28 and the mounting base 23 is small, which benefits a stable rotation of the mounting base 23, thereby improving the optical stabilization performance of the first camera module 20.

Reference throughout this specification to "an embodiment", "some embodiments", "an exemplary embodiment", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of present disclosure have been shown and described above, it should be understood by those skilled in the art that changes, alternatives, and modifications can be made to the embodiments without departing from spirit and principles of the present disclosure. The scope of the present disclosure is limited by the attached claims and its equivalents.

What is claimed is:

1. A camera module, comprising:
   a casing having a light inlet;
   a mounting base disposed in the casing;
   a light deflection element fixed to the mounting base, and configured to deflect an incident light entering through the light inlet;
   an image sensor arranged in the casing and configured to sense the deflected incident light; and
   a driving device having an arc rail, and configured to drive the mounting base to rotate around a central axis of the arc rail along the arc rail,
   wherein the central axis of the arc rail is arranged at a side of the arc rail facing the light deflection element, and the light deflection element is arranged between the arc rail and the central axis of the arc rail;
   wherein a normal line of the arc rail is parallel to a light incident direction of the light inlet and perpendicular to a light-sensing direction of the image sensor;
   wherein the light deflection element comprises:
   a light incident surface adjacent to and facing the light inlet;
   a fixing surface away from the light inlet and opposite to the light incident surface;
   a reflecting surface connected to the light incident surface and the fixing surface, and arranged obliquely relative to the light incident surface; and
   a light exiting surface connected to the light incident surface and the fixing surface, and arranged opposite to the reflecting surface; and
   wherein a distance between the light incident surface and the fixing surface ranges from 4.8 to 5.0 mm.

2. The camera module according to claim 1, wherein the mounting base comprises an arc surface arranged concentrically with the arc rail and fitted with the arc rail.

3. The camera module according to claim 1, wherein the central axis is perpendicular to the light incident direction of the light inlet and the light-sensing direction of the image sensor.

4. The camera module according to claim 1, wherein the central axis is located outside the camera module.

5. The camera module according to claim 1, wherein the driving device is arranged on a bottom of the casing.

6. The camera module according to claim 1, wherein the driving device is configured to drive the mounting base to rotate in an electromagnetic manner.

7. The camera module according to claim 1 wherein the light incident surface is arranged parallel to the fixing surface.

8. The camera module according to claim 1, comprising:
   a movable element accommodated in the casing and disposed at a side of the image sensor;
   a plurality of lenses fixed to the movable element; and
   a driving mechanism connected to the casing and the movable element, the driving mechanism being configured to drive the movable element to move along optical axes of the plurality of lenses.

9. The camera module according to claim 8, wherein the movable element has a tube shape, and the plurality of lenses are fixed in the movable element at intervals along an axial direction of the movable element.

10. The camera module according to claim 8, wherein the movable element comprises two clips configured to clamp the plurality of lenses therebetween.

11. The camera module according to claim 8, wherein the movable element is arranged between the light deflection element and the image sensor.

12. A camera assembly, comprising:
    a camera module comprising:
    a casing having a light inlet;
    a light deflection element, a mounting base and an image sensor disposed in the casing, the light deflection element being fixed to the mounting base, and configured to deflect an incident light entering through the light inlet and send the deflected incident light to the image sensor; and
    a driving device having an arc rail, and configured to drive the mounting base to rotate around a central axis of the arc rail along the arc rail; and
    a decoration member arranged over the light inlet,
    wherein the central axis of the arc rail is arranged at a side of the arc rail facing the light deflection element, and the light deflection element is arranged between the arc rail and the central axis of the arc rail;
    wherein a normal line of the arc rail is parallel to a light incident direction of the light inlet and perpendicular to a light-sensing direction of the image sensor;
    wherein the light deflection element comprises:

a light incident surface adjacent to and facing the light inlet; a fixing surface away from the light inlet and opposite to the light incident surface;

a reflecting surface connected to the light incident surface and the fixing surface, and arranged obliquely relative to the light incident surface; and a light exiting surface connected to the light incident surface and the fixing surface, and arranged opposite to the reflecting surface; and wherein a distance between the light incident surface and the fixing surface ranges from 4.8 to 5.0 mm.

13. The camera assembly according to claim 12, wherein in a width direction of the camera module, the casing defines a groove at a side of the light inlet, and the decoration member is partially fitted in the groove.

14. The camera assembly according to claim 13, wherein the casing comprises a top wall and a side wall extending from a side edge of the top wall, the light inlet is formed in the top wall, the groove is formed in a junction between the top wall and the side wall, and the decoration member rests against the top wall.

15. The camera assembly according to claim 14, wherein two side walls are provided, the top wall comprises two opposite side edges, each side wall extends from a corresponding side edge, and the groove is formed in the junction between each side wall and the top wall.

16. The camera assembly according to claim 13, wherein the decoration member comprises:

a decoration ring defining a through hole therein, the light inlet being exposed from the through hole; and a flange extending from a bottom of the decoration ring in a direction running away from the decoration ring.

17. The camera assembly according to claim 16, wherein the bottom of the decoration ring is partially fitted in the groove.

18. The camera assembly according to claim 16, comprising a further camera module arranged adjacent to the camera module, wherein the decoration member comprises a further through hole, the further camera module is exposed from the further through hole, and the further through hole is spaced apart from the through hole.

19. An electronic device, comprising:

a housing having an outer surface and an inner surface; and a camera assembly disposed to the housing, the camera assembly comprising:

a casing having a light inlet a decoration ring arranged on the casing, penetrating the housing and protruding from the outer surface of the housing;

a flange extending from a bottom of the decoration ring in a direction running away from the decoration ring, and abutting against the inner surface of the housing;

a mounting base disposed in the casing;

a light deflection element fixed to the mounting base, and configured to deflect a light incident through the light inlet;

an image sensor arranged at a side of the light deflection element and configured to sense the deflected light; and a driving device having an arc rail, and configured to drive the mounting base to rotate around a central axis of the arc rail along the arc rail, wherein the central axis of the arc rail is arranged at a side of the arc rail facing the light deflection element, and the light deflection element is arranged between the arc rail and the central axis of the arc rail;

wherein a normal line of the arc rail is parallel to a light incident direction of the light inlet and perpendicular to a light-sensing direction of the image sensor;

wherein the light deflection element comprises:

a light incident surface adjacent to and facing the light inlet; a fixing surface away from the light inlet and opposite to the light incident surface;

a reflecting surface connected to the light incident surface and the fixing surface, and arranged obliquely relative to the light incident surface; and a light exiting surface connected to the light incident surface and the fixing surface, and arranged opposite to the reflecting surface; and wherein a distance between the light incident surface and the fixing surface ranges from 4.8 to 5.0 mm.

* * * * *